(12) United States Patent
Zhang et al.

(10) Patent No.: US 12,340,010 B2
(45) Date of Patent: Jun. 24, 2025

(54) METHOD AND APPARATUS FOR ACQUIRING OBJECT'S ATTENTION INFORMATION AND ELECTRONIC DEVICE

(71) Applicant: Lenovo (Beijing) Limited, Beijing (CN)

(72) Inventors: Guannan Zhang, Beijing (CN); Wanwan Zhao, Beijing (CN); Xiaoyan Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 213 days.

(21) Appl. No.: 18/166,131

(22) Filed: Feb. 8, 2023

(65) Prior Publication Data

US 2023/0251706 A1 Aug. 10, 2023

(30) Foreign Application Priority Data

Feb. 8, 2022 (CN) .......................... 202210118195.4

(51) Int. Cl.
| | | |
|---|---|---|
| *G06F 3/01* | (2006.01) | |
| *G06Q 30/0201* | (2023.01) | |
| *G06T 7/73* | (2017.01) | |
| *G06T 15/06* | (2011.01) | |
| *G06T 19/00* | (2011.01) | |

(52) U.S. Cl.
CPC ................ *G06F 3/011* (2013.01); *G06T 7/73* (2017.01); *G06T 15/06* (2013.01); *G06T 19/00* (2013.01); *G06Q 30/0201* (2013.01)

(58) Field of Classification Search
CPC ........ G06F 3/011; G06F 3/04815; G06T 7/73; G06T 15/06; G06T 19/00; G06T 19/20; G06T 15/10; G06Q 30/0201; G06Q 30/0203; G06V 20/64
USPC ........................................................... 345/419
See application file for complete search history.

(56) References Cited

U.S. PATENT DOCUMENTS

| | | | | |
|---|---|---|---|---|
| 8,542,232 | B2* | 9/2013 | Hyndman | G06Q 10/08 |
| | | | | 345/419 |
| 10,055,892 | B2* | 8/2018 | Petrovskaya | G06T 15/04 |
| 10,095,374 | B2* | 10/2018 | Ren | G06T 19/006 |
| 10,262,036 | B2* | 4/2019 | Paine | G06F 16/24569 |
| 10,395,428 | B2* | 8/2019 | Stafford | G02B 27/017 |
| 10,467,809 | B2* | 11/2019 | Khalid | H04N 21/41415 |
| 10,565,761 | B2* | 2/2020 | DeLuca | G02B 27/017 |
| 11,010,949 | B2* | 5/2021 | DeLuca | G02B 27/0172 |

(Continued)

FOREIGN PATENT DOCUMENTS

| | | | | |
|---|---|---|---|---|
| CN | 109064390 A | * | 12/2018 | ............. G06T 11/60 |
| CN | 109191188 A | * | 1/2019 | |

(Continued)

*Primary Examiner* — Sheree N Brown
(74) *Attorney, Agent, or Firm* — ANOVA LAW GROUP, PLLC

(57) ABSTRACT

A method for acquiring an object's attention information includes: displaying a three-dimensional (3D) virtual image in a virtual scene, the 3D virtual image being a 3D image corresponding to a virtual object in the virtual scene mapped from a physical object; determining a target object of the 3D virtual image displayed in a display area; and based on the target object, determining an attention focus object of the 3D virtual image, the attention focus object belonging to at least a part of the 3D virtual image.

20 Claims, 9 Drawing Sheets

Displaying a 3D virtual image in a virtual scene — S101

Determining a target object of the 3D virtual image displayed in the display area — S102

Based on the target object, determining an attention focus object of the 3D virtual image — S103

(56) References Cited

U.S. PATENT DOCUMENTS

| | | | |
|---|---|---|---|
| 11,281,351 B2* | 3/2022 | Nguyen | G06F 3/04845 |
| 11,568,604 B2* | 1/2023 | Stafford | G06F 3/04842 |
| 11,610,381 B2* | 3/2023 | Mihara | G06T 19/00 |
| 2001/0009418 A1* | 7/2001 | Hiroike | G06F 3/011 |
| | | | 345/679 |
| 2010/0164956 A1* | 7/2010 | Hyndman | G06Q 10/08 |
| | | | 345/427 |
| 2015/0135128 A1* | 5/2015 | Ren | G06F 3/04842 |
| | | | 715/781 |
| 2016/0070439 A1* | 3/2016 | Bostick | G06F 3/0304 |
| | | | 715/728 |
| 2016/0357491 A1* | 12/2016 | Oya | G06T 19/006 |
| 2017/0205892 A1* | 7/2017 | Petrovskaya | G06T 19/006 |
| 2017/0358141 A1* | 12/2017 | Stafford | G06T 7/246 |
| 2018/0189354 A1* | 7/2018 | Paine | G06F 3/0304 |
| 2018/0190010 A1* | 7/2018 | Sawaki | G06F 3/011 |
| 2019/0180483 A1* | 6/2019 | DeLuca | G02B 27/017 |
| 2019/0362528 A1* | 11/2019 | DeLuca | G06F 3/011 |
| 2019/0371075 A1* | 12/2019 | Stafford | G06F 3/0482 |
| 2020/0402310 A1* | 12/2020 | Nidaira | G06T 19/006 |
| 2021/0241534 A1* | 8/2021 | Avisar | G06T 19/003 |
| 2022/0206298 A1* | 6/2022 | Goodman | G06F 3/011 |
| 2022/0214743 A1* | 7/2022 | Dascola | G06F 3/017 |

FOREIGN PATENT DOCUMENTS

| | | | | |
|---|---|---|---|---|
| CN | 109542226 A | * | 3/2019 | |
| CN | 113470161 A | * | 10/2021 | |
| CN | 113470161 B | * | 6/2022 | |
| CN | 109064390 B | * | 4/2023 | G06T 11/60 |
| EP | 3506210 A1 | * | 7/2019 | G06T 15/205 |
| JP | 2001195611 A | * | 7/2001 | G06F 3/011 |
| WO | WO-2020218041 A1 | * | 10/2020 | G06F 3/04815 |

* cited by examiner

METHOD AND APPARATUS FOR ACQUIRING OBJECT'S ATTENTION INFORMATION AND ELECTRONIC DEVICE

CROSS-REFERENCE TO RELATED APPLICATION

This application claims priority to Chinese Patent Application No. 202210118195.4, filed on Feb. 8, 2022, the entire content of which is incorporated herein by reference.

TECHNICAL FIELD

The present disclosure relates to the technical field of image processing technologies and, more particularly, to a method, an apparatus, and an electronic device for acquiring an object's attention information.

BACKGROUND

After a product is released, it is often necessary to collect user's opinions on the product. Aspects or parts of the product that receive attention from the users need to be well maintained or optimized.

Currently, the user's opinions on the product are often obtained through questionnaires or product reviews. However, the user's opinions may cover a wide range of product aspects or components, and it is hard to accurately determine the aspects or parts of the product that gather the opinions from most users, thereby impeding effective optimization of the product.

SUMMARY

One aspect of the present disclosure provides a method for acquiring an object's attention information. The method includes: displaying a three-dimensional (3D) virtual image in a virtual scene, the 3D virtual image being a 3D image corresponding to a virtual object in the virtual scene mapped from a physical object; determining a target object of the 3D virtual image displayed in a display area; and based on the target object, determining an attention focus object of the 3D virtual image, the attention focus object belonging to at least a part of the 3D virtual image.

Another aspect of the present disclosure provides an apparatus for acquiring an object's attention information. The apparatus includes: a memory storing a computer program; and a processor coupled to the memory and configured to execute the computer program to: display a three-dimensional (3D) virtual image in a virtual scene, the 3D virtual image being a 3D image corresponding to a virtual object in the virtual scene mapped from a physical object; determine a target object of the 3D virtual image displayed in a display area; and based on the target object, determine an attention focus object of the 3D virtual image, the attention focus object belonging to at least a part of the 3D virtual image.

Another aspect of the present disclosure provides an electronic device. The electronic device includes an apparatus for acquiring an object's attention information. The apparatus includes: a memory storing a computer program; and a processor coupled to the memory and configured to execute the computer program to: display a three-dimensional (3D) virtual image in a virtual scene, the 3D virtual image being a 3D image corresponding to a virtual object in the virtual scene mapped from a physical object; determine a target object of the 3D virtual image displayed in a display area; and based on the target object, determine an attention focus object of the 3D virtual image, the attention focus object belonging to at least a part of the 3D virtual image.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

In the description of the embodiments of the present disclosure, it should be noted that, unless otherwise stated and limited, the term "connection" should be understood in a broad sense, for example, it may be an electrical connection, an internal communication between two components, or a direct connection, and may also be indirectly connected through an intermediate medium. Those of ordinary skill in the art could understand the specific meanings of the above term according to specific situations.

It should be noted that the terms such as "first\second\third" involved in the embodiments of the present disclosure are only used to distinguish similar objects, and do not represent a specific ordering of the objects. It is understood that the terms such as "first\second\third" may be interchanged in a specific order or sequence where permitted. It should be understood that the objects distinguished by the terms such as "first\second\third" distinctions may be interchanged under appropriate circumstances so that the embodiments of the present disclosure described herein may be practiced in sequences other than those illustrated or described herein.

Embodiments of the present disclosure can be applied to product display platforms or e-commerce platforms to display 3D virtual images of objects such as products or objects through virtual scenes. A physical object corresponding to a 3D virtual object can be determined according to a user's attention (or focus) on the 3D virtual object in the 3D virtual image, such that accurate and reliable user attention data can be provided for physical object or product optimization or big data analysis.

Figure 1:
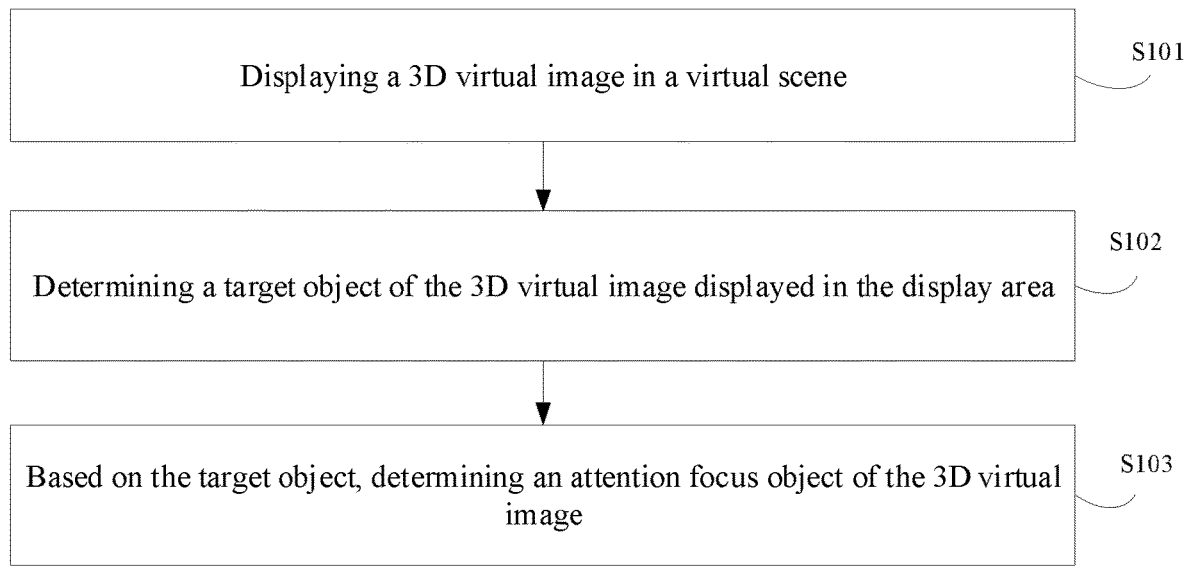
FIG. 1 is a flowchart of an exemplary method for acquiring an object's attention information according to some embodiments of the present disclosure.

FIG. 1 is a flowchart of an exemplary method for acquiring an object's attention information according to some embodiments of the present disclosure. The method may be applied to an electronic device. The electronic device may be a server, such as a server for an e-commerce platform or a product display platform. The electronic device may also be a terminal device, such as a mobile phone, and a notebook computer, etc.

In some embodiments, the terminal device may establish a communication connection with a service for providing virtual scene data. For example, the terminal device may be a terminal that establishes the communication connection with the server of the e-commerce platform or the product display platform, and a terminal that obtains 3D virtual image data in a virtual scene from the server of the e-commerce platform or the product display platform.

In some other embodiments, the terminal device may be an independent computer device. The virtual scene data that need to be displayed may be stored in the terminal device. The present disclosure does not impose any limitation.

As shown in FIG. 1, the method includes the following processes.

At S101, a 3D virtual image in a virtual scene is displayed.

The 3D virtual image is a 3D image corresponding to a virtual object in the virtual scene mapped from a physical object.

For example, the 3D virtual image of the virtual object is digital twin information of the physical object. That is, the 3D virtual image of the virtual object is a 3D virtual image created for the physical object using a digital twin technology. A composition structure and appearance of the 3D virtual image virtual object are consistent with the composition structure and appearance of the real physical object. Further, a size of the virtual object in the 3D virtual image can also configured to be proportional to a size of the real physical object.

For example, it is assumed that in order to obtain user's attention to different parts of a product, a virtual scene including a 3D virtual image of the product may be constructed. The composition and shape of the 3D virtual image of the product may be consistent with the product, and the size of the 3D virtual image may be the same as the size of the product or may be configured to be proportional to the size of the product.

A type of the 3D virtual image may vary according to a spatial dimension of the virtual scene. For example, the 3D virtual image may be a three-dimensional virtual image, or may be a virtual image with other dimensions, which are not limited by the present disclosure.

It should be understood that displaying the 3D virtual image of the virtual scene is a process of mapping the 3D virtual image to a two-dimensional (2D) display area, that is, a process of converting each pixel in the 3D virtual image from the world coordinate system to a screen coordinate system. The present disclosure does not impose any limitation on the actual implementation processes.

In some embodiments, the virtual object may be displayed in the display screen of the electronic device, or may be projected by the electronic device to a display area outside or inside the electronic device, which is not limited by the present disclosure.

For example, the electronic device is the terminal device. The terminal device may output the 3D virtual image to the display screen thereof, output the 3D virtual image to other display screen, or project the 3D virtual image to a specified display area (e.g., a display area of a wall or a curtain).

In another example, the electronic device is a server. The server may output the 3D virtual image to the terminal device and display the 3D virtual image on the display screen of the terminal device.

At S102, a target object of the 3D virtual image displayed in the display area is determined.

The display area is a display area for displaying the 3D virtual image. For example, when the electronic device displays the 3D virtual image on the display screen thereof or a display screen of another electronic device, the display area may be the display screen (or the display area of the display screen). When the electronic device projects the 3D virtual image onto a projection screen or a wall, an image display area of the projection screen or the wall is the display area.

It should be understood that the 3D virtual image is displayed in the 2D display area. A portion of the 3D virtual image is displayed in the display area and visible to a user. Another portion of the 3D virtual image is not displayed in the display area and is invisible to the user. In some embodiments, the target object may be located in a target image area of the 3D virtual image that is displayed in the display area, or may be a constituent object in the target image area of the 3D virtual image that is displayed in the display area.

For example, the target object may be located in the target image area of the 3D virtual image displayed in the display area, or may include all the constituent objects in the target image area.

For example, the 3D virtual image is a 3D virtual image of a notebook computer. The 3D virtual image displayed in the display area may only include display and keyboard parts of the notebook computer. The target object may be an image portion displayed in the display area and mapped from the 3D virtual image of the notebook computer, or may be two constituent objects of the screen and the keyboard in the 3D virtual image.

In some embodiments, the target object may be the image portion displayed in the display area and mapped from the 3D virtual image, or may be the constituent objects in the image portion. For example, position distribution features in the target image area of the 3D virtual image displayed in the display area may be used to determine from the target image area the image portion that is more likely to be noticed by the user, or the constituent objects included in the image portion.

There are various ways to determine the target image area of the 3D virtual image displayed in the display area.

For example, a current viewpoint position in the virtual scene may be used to determine the target image area of the 3D virtual image displayed in the display area.

The viewpoint position in the virtual scene may be a viewing point virtualized in the virtual scene. The viewpoint position is a reference point for mapping the 3D virtual image in the scene to a 2D screen plane.

In some embodiments, a virtual camera may be set up in the virtual scene. An initial position of the virtual camera may be fixed. As the user rotates and zooms the virtual scene, the position of the virtual camera will change correspondingly. As such, a current spatial position of the virtual camera in the virtual scene can be used as the viewpoint position to determine the target image area of the 3D virtual image displayed in the display area.

It should be noted that the virtual camera is not visible in the virtual scene, but is only a virtualized reference point for determining the viewpoint position and the target object.

At S103, an attention focus object of the 3D virtual image is determined based on the target object.

The attention focus object includes at least a part of the 3D virtual image.

It should be understood that the attention focus object may be an image portion in the 3D virtual image that catches the user's attention, or may be a constituent object in the image portion that catches the user's attention.

It should be understood that the target object may include the entire 3D virtual image displayed in the display area that catches the user's attention. In this case, the target object is the attention focus object.

In some embodiments, only a portion of the target object catches the user's attention. Certain features of the target object may be used to determine the attention focus object that catches the user's attention.

In some embodiments, the target object may be determined to include a plurality of constituents. For example, the target object may include at least one target object area in the 3D virtual image and at least one display feature of the target object area.

The target object area may be an image portion including the target object or a constituent area.

The display feature of the target object area may include: a display position of the target object area in the display area and an area occupation ratio of the target object area over an image display area of the 3D virtual image, which are not limited by the present disclosure. The image display area of the 3D virtual image may also be called an image mapping area, that is, the display area occupied by the 3D virtual image in an image mapping display area.

It should be understood that the display feature of the target object area may reflect possibility of being noticed by the user. As such, the attention focus object can be determined in at least one target object area based on the display feature of the at least one target object area.

For example, the target object area having a display position located in a center area of the display area can be determined to be the attention focus object. In another example, at least one target object area having a relatively high area occupation ratio can be determined to be the attention focus object.

For example, the 3D virtual image is the 3D virtual image of a notebook computer. It is assumed that the 3D virtual image of the notebook computer displayed in the display area includes a front portion of the notebook computer. The target object displayed in the display area may include a screen area and a keyboard area. As such, positions of the screen area and the keyboard area within the display area may be obtained respectively, and the area occupation ratio of the screen area and the keyboard area over the image display area of the 3D virtual image of the notebook computer in the display area may also be obtained respectively.

If the display position of the screen area is closer to the center area of the display area than the keyboard area, and the area occupation ratio of the screen area is substantially greater than the area occupation ratio of the keyboard area, the user is more likely to pay attention to the screen area. Thus, the screen is determined to be the attention focus object of the user.

In another example, the display positions of the keyboard area and the screen area are located in the center area of the display area, and a difference between the area occupation ratios of these two areas is small. As such, the user may pay attention to these two areas at the same time, and the both the keyboard area and the screen area (or the virtual keyboard and the virtual screen) may be determined to be the attention focus objects.

It should be understood that because the 3D virtual image is a mapping of the real physical object in the virtual scene, the user's attention focus object on the 3D virtual image reflects the user's focus attention on the physical object, and the part of the physical object on which the user mainly focuses can be accurately determined. Further, collection of attention focus parts of the physical object from a large number of different users may be used for big data analysis to predict user behaviors or to obtain specific analysis results, which are not limited by the present disclosure.

From the above solutions, the embodiments of the present disclosure display the 3D virtual image in the virtual scene, determine the target object of the 3D virtual image displayed in the display area, and the user's attention focus object in the 3D virtual image based on the target object. Because the 3D virtual image is a 3D image corresponding to the virtual object mapped from the physical object into the virtual scene, the attention focus object in the 3D virtual image reflects the part of the physical object that catches the user's attention. Thus, the user's attention focus on the physical object can be accurately obtained, and the physical object such as the product can be reasonably optimized based on the user's attention on the physical object such as the product.

To facilitate the comprehension of the present disclosure, several possible scenarios of determining the target object of the 3D virtual image displayed in the display area will be described in detail below.

In some embodiments, all objects of the 3D virtual image displayed in the display area may be determined as the target object.

For example, as previously described, the target image area of the 3D virtual image displayed in the display area may be determined as the target object. In another example, after the target image area is determined, the constituent objects included in the target image area may be determined as the target object.

In this case, the all objects located in the display area may be determined as the objects to which the user pays attention.

Figure 2:
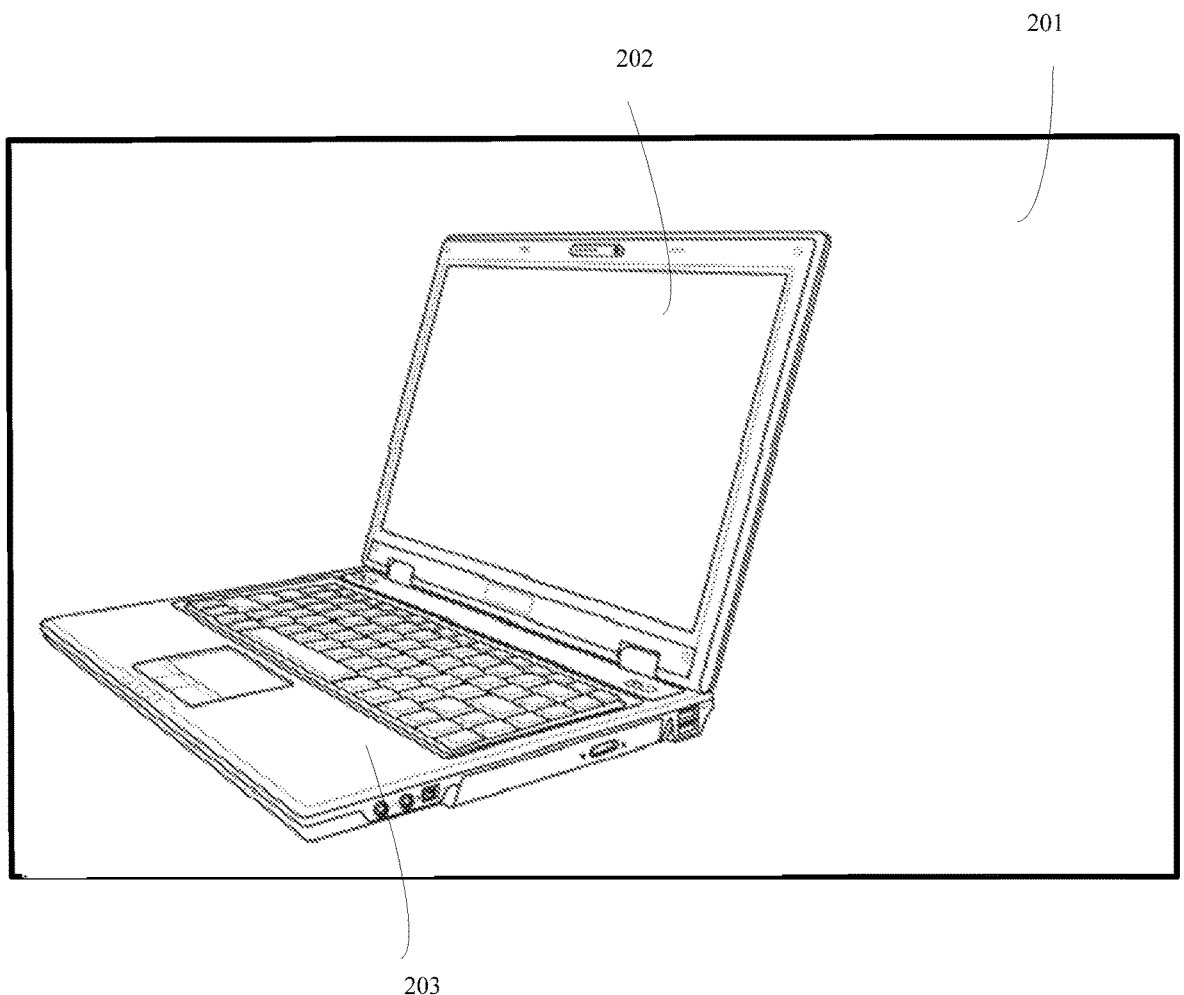
FIG. 2 is a schematic diagram of an exemplary three-dimensional (3D) virtual image displayed in a display area according to some embodiments of the present disclosure.
Figure 3:
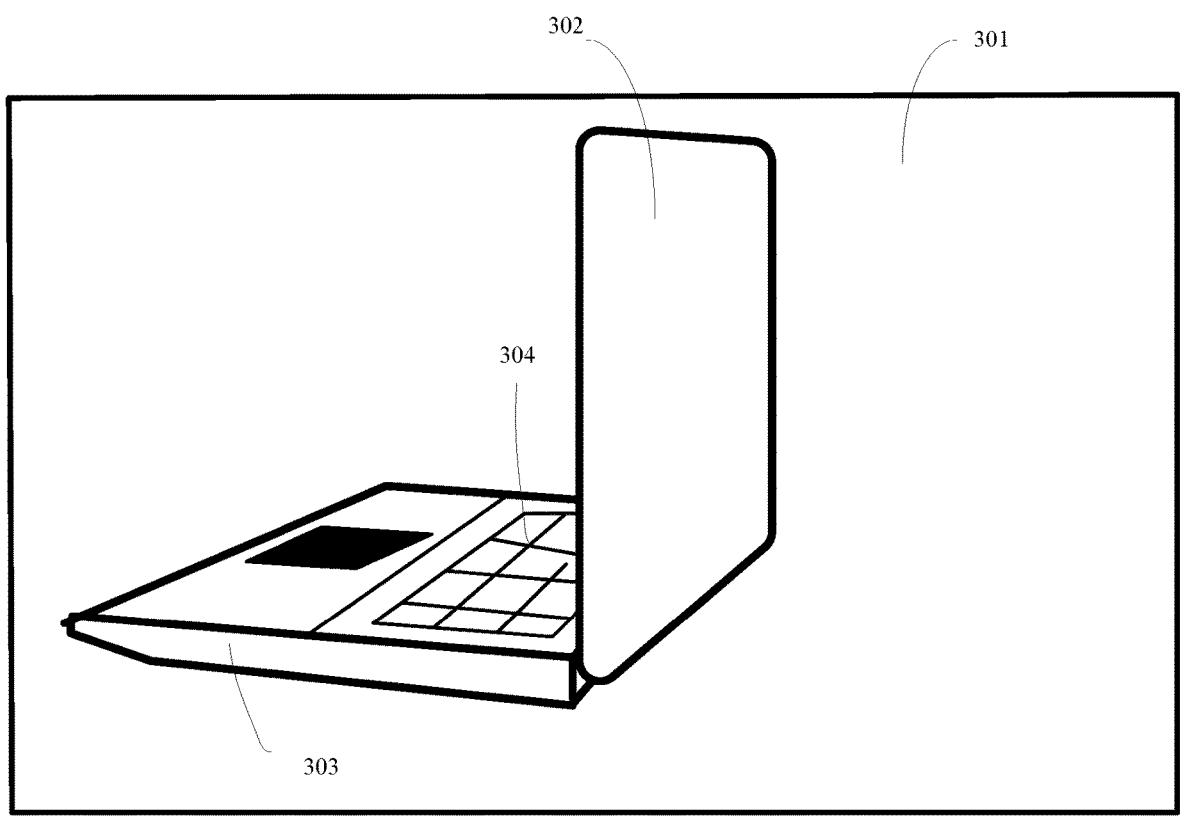
FIG. 3 is a schematic diagram of another exemplary 3D virtual image displayed in a display area according to some embodiments of the present disclosure.

For example, FIG. 2 is a schematic diagram of an exemplary three-dimensional (3D) virtual image displayed in a display area according to some embodiments of the present disclosure, and FIG. 3 is a schematic diagram of another exemplary 3D virtual image displayed in a display area according to some embodiments of the present disclosure. As shown in FIG. 2 and FIG. 3, the 3D virtual image displayed in the display area is mapped from a notebook computer.

As shown in FIG. 2, the part of the 3D virtual image of the notebook computer displayed in the display area 201 includes a screen image area 202 and a keyboard image area 203 in the 3D virtual image of the notebook computer. The screen image area 202 and the keyboard image area 203 both may be determined as the target object.

The screen image area represents a constituent screen (i.e., the virtual screen) in the 3D virtual image of the notebook computer. Similarly, the keyboard image area represents a constituent keyboard (i.e., the virtual keyboard) in the 3D virtual image of the notebook computer. The constituent keyboard and the constituent screen that form the 3D virtual image both may be determined as the target object.

As shown in FIG. 3, the part of the notebook computer in the 3D virtual image displayed in the display area 301 includes a side part of the notebook computer. The part of the notebook computer in the 3D virtual image displayed in the display area includes: a back panel image area 302, a chassis image area 303, a keyboard image area 304. As such, the back panel image area 302, the chassis image area 303, and the keyboard image area 304 all may be determined as the target object.

In practical applications, after the 3D virtual image is displayed in the display area, the use may only pay attention to a part of the target image area. In this case, to accurately obtain the user's attention focus object in the 3D virtual image, it is necessary to determine the target object in some key areas of the 3D virtual image displayed in the display area.

In some embodiments, the target object is determined in a sampling area of the 3D virtual image displayed in the display area.

The sampling area may be configured in the display area, and may belong to the part of the display area that catches the user's attention.

Figure 4:
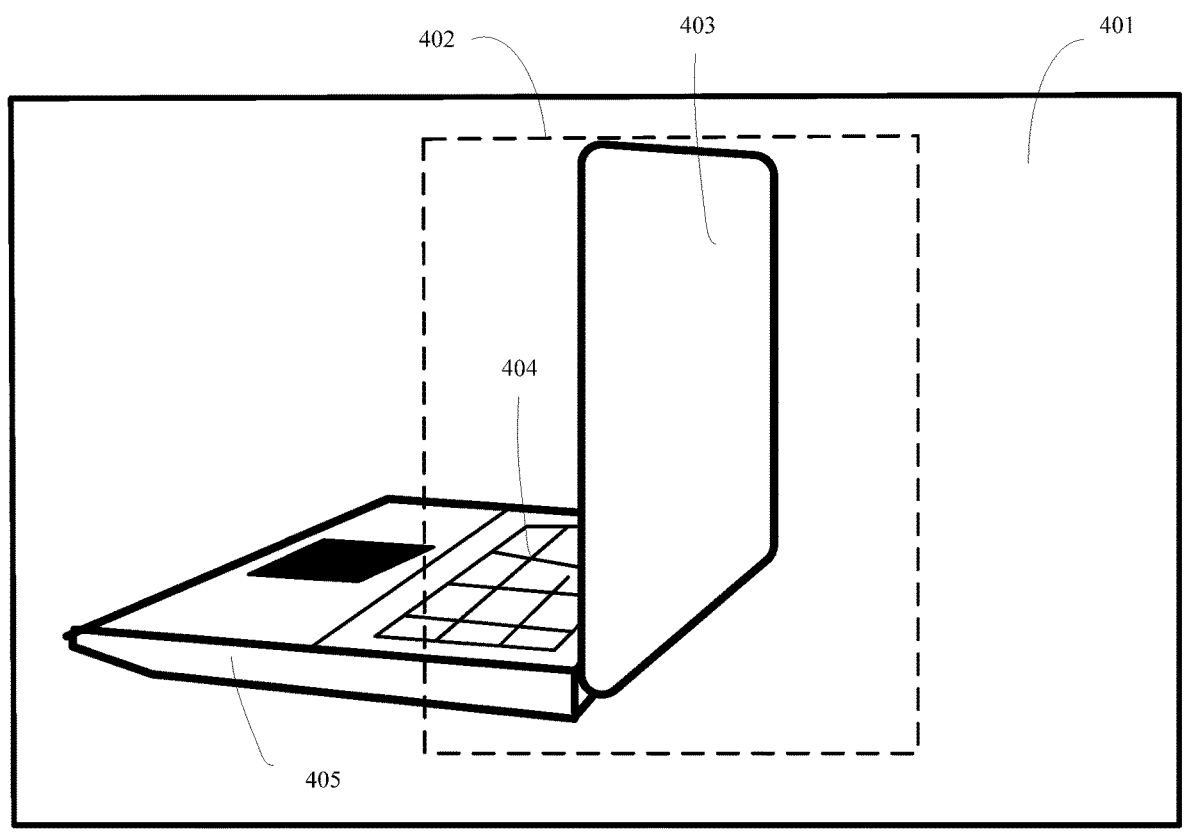
FIG. 4 is a schematic diagram of an exemplary relationship between the 3D virtual image displayed in the display area and a sampling area according to some embodiments of the present disclosure.

For example, the sampling area may be an area in the center area of the display area. Referring to FIG. 4, a sampling area 402 is configured in the center area of the display area 401. In this case, the only object part in the sampling area of the 3D virtual image of the notebook computer includes the screen image area 403 and the keyboard image area 404. The chassis image area 405 is not located inside the sampling area, and thus will not be determined as the target object.

It should be understood that after the 3D virtual image is displayed, the user often rotates or zooms in and out the 3D virtual image according to the user's attention need, such that the part of the 3D virtual image that catches the user's attention is located in an attention focus area such as the center area of the display area. Thus, the object part in the sampling area of the 3D virtual image displayed in the center area of the display area is determined as the target object, thereby accurately reflecting the user's attention focus of the 3D virtual image.

The embodiments of the present disclosure will be described below by taking an example of determining the object part in the sampling area of the 3D virtual image displayed in the display area as the target object.

Figure 5:
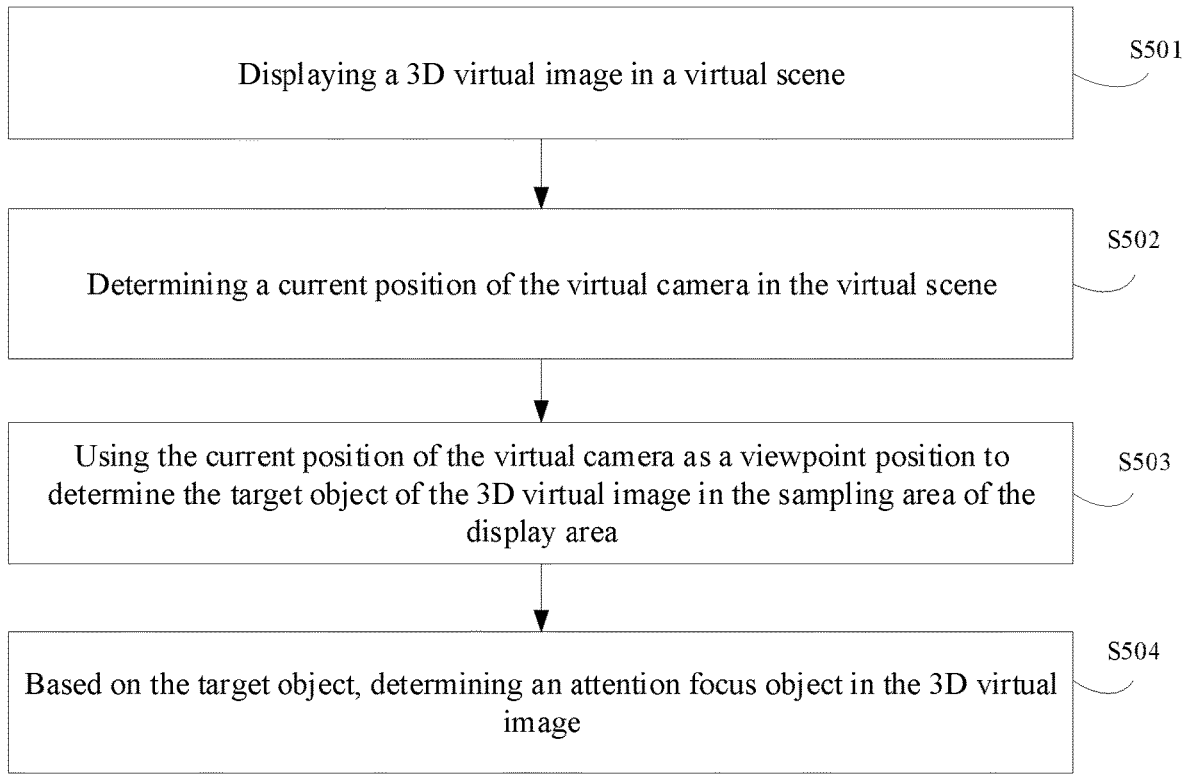
FIG. 5 is a flowchart of another exemplary method for acquiring an object's attention information according to some embodiments of the present disclosure.

FIG. 5 is a flowchart of another exemplary method for acquiring an object's attention information according to some embodiments of the present disclosure. The method may be applied to the previously-described electronic device. As shown in FIG. 5, the method includes the following processes.

At S501, a 3D virtual image in a virtual scene is displayed.

The 3D virtual image is a 3D image corresponding to a virtual image in the virtual scene mapped from a physical object.

Displaying the 3D virtual image in the virtual scene in the display area is actually a process of mapping a 3D or multiple-dimension virtual image into a 2D display area.

For illustration purpose, a virtual camera is configured in the virtual scene. The virtual camera is configured at an initial spatial position. When the 3D virtual image is displayed in the display area, a camera coordinate system may be constructed based on the initial spatial position. A relationship between the camera coordinate system and the world coordinate system may be used to map the 3D virtual image into the display area.

After the 3D virtual image is displayed, based on user's adjustment operations such as rotating or zooming in and out the 3D virtual image, the position of the virtual camera in the virtual scene may be adjusted correspondingly. Accordingly, the camera coordinate system constructed based on the position of the virtual camera may be adjusted.

A process of displaying the 3D virtual image based on the camera coordinate system constructed based on the position of the virtual camera is described below.

The relationship between the camera coordinate system and the world coordinate system is used to determine a first transformation matrix for converting coordinates from the world coordinate system to the camera coordinate system. Based on the first transformation matrix, coordinates of each pixel in the 3D virtual image are converted from the world coordinate system into the camera coordinate system.

A relationship between the camera coordinate system and a standardized device coordinate system is used to determine a second transformation matrix for converting coordinates from the camera coordinate system to the standardized device coordinate system. Based on the second transformation matrix, coordinates of each pixel in the 3D virtual image are converted from the camera coordinate system into the standardized device coordinate system.

Based on a mapping relationship between the standardized device coordinate system and the screen coordinate system, coordinates of each pixel in the 3D virtual image are converted from the standardized device coordinate system into the screen coordinate system. Based on the coordinates of each pixel in the 3D virtual image in the screen coordinate system, the 3D virtual image is displayed in the display area.

For example, when the coordinates (x1, y1, z1) of a pixel in the 3D virtual image of the virtual object is known in the standardized device coordinate system, the coordinates (x2, y2) in the screen coordinate system may be obtained by using the following conversion formulas:

$$x2 = (0.5 + x1/2) * w;$$

$$y2 = (0.5 - y1/2) * h;$$

where w is a width of the screen, that is, a width of the display area for displaying the 3D virtual image, and h is a height of the screen, that is, a height of the display screen or a height of the display area. For example, when the 3D virtual image of the virtual object is displayed on the display screen, the width of the screen may be a display width of the display screen. When the 3D virtual image of the virtual object is projected a display area of another type, the width of the screen may be a width of the display area for displaying the projected image.

In practical applications, based on the camera coordinate system corresponding to the virtual camera, mapping the 3D virtual image into the screen coordinate system may also be implemented in other manners, which are not limited by the present disclosure.

At S502, a current position of the virtual camera in the virtual scene is determined.

As previously described, the position of the virtual camera in the virtual scene may change as the user adjusts the 3D virtual image. The current position of the virtual camera needs to be determined before determining the target object located in the display area or the sampling area.

At S503, the target object of the 3D virtual image is determined in the sampling area of the display area using the current position of the virtual camera as the viewpoint position.

The viewpoint position in the virtual scene may be a virtualized viewpoint position in the virtual scene. The viewpoint position may be a viewing angle position of a virtualized user who watches the virtual scene.

Correspondingly, the 3D virtual image observed at the viewpoint position may be simulated to obtain the target object located in the sampling area.

Figure 6:
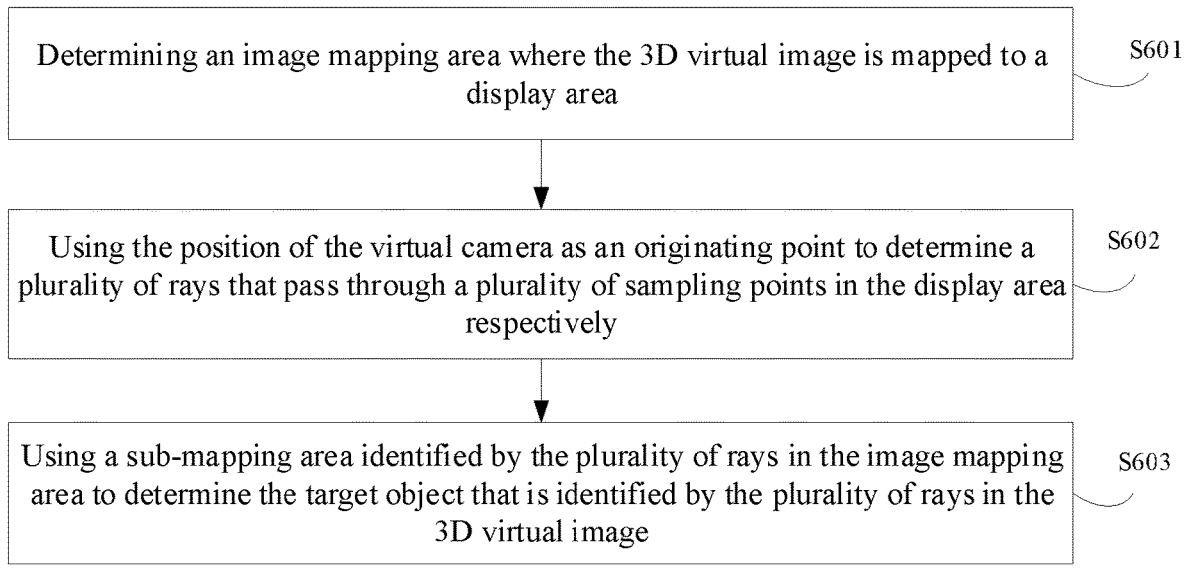
FIG. 6 is a flowchart of determining a target object in the sampling area of the 3D virtual image according to some embodiments of the present disclosure.

The embodiments of determining the target object in the sampling area are described in detail below. FIG. 6 is a flowchart of determining a target object in the sampling area of the 3D virtual image according to some embodiments of the present disclosure. As shown in FIG. 6, the flowchart includes the following processes.

At S601, an image mapping area where the 3D virtual image is mapped to a display area is determined.

The image mapping area is an effective display area of the 3D virtual image in the display area after the 3D virtual image is mapped to the display area.

The image mapping area may be a minimum area in the display area that completely contains the 3D virtual image.

In some embodiments, the coordinates of each pixel in the 3D virtual image in the screen coordinate system are determined. A maximum value and a minimum value on the x-coordinate axis, and a maximum value and a minimum value on the y-coordinate axis are determined based on the coordinates of each pixel in the 3D virtual image. The maximum value and the minimum value on the x-coordinate axis, and the maximum value and the minimum value on the y-coordinate axis are used to determine the image mapping area of the 3D virtual image in the display area.

Figure 7:
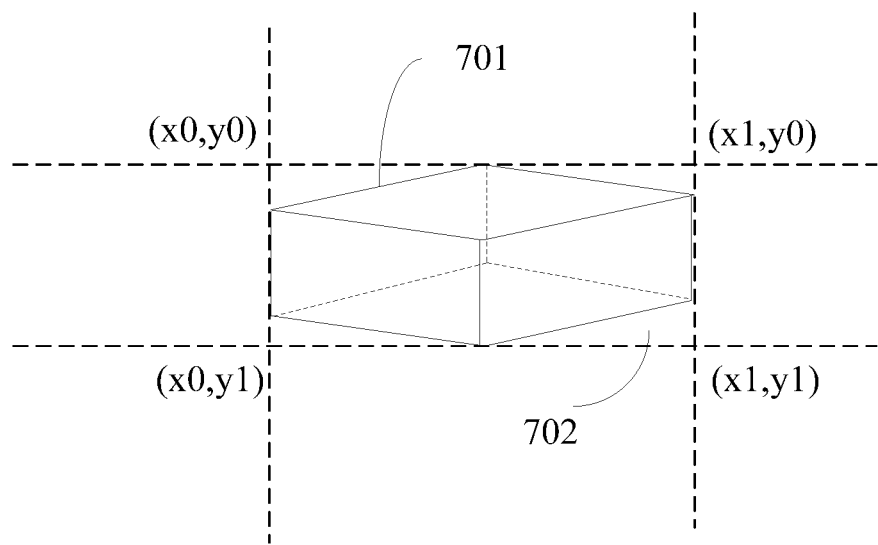
FIG. 7 is a schematic diagram of an image mapping area in the 3D virtual image according to some embodiments of the present disclosure.

FIG. 7 is a schematic diagram of an image mapping area in the 3D virtual image according to some embodiments of the present disclosure. As shown in FIG. 7, the 3D virtual image is a space cube.

After the screen coordinates of each pixel of the space cube projected to the display area are determined, in the screen coordinate system of the display area, the minimum value and the maximum value on the x-coordinate axis of the screen coordinates for each pixel of the space cube 701 are x0 and x1, respectively, and the minimum value and the maximum value on the y-coordinate axis are y0 and y1, respectively. Displaying the maximum values and the minimum values on the x-coordinate axis and the y-coordinate axis of the space cube 701 may construct a minimum square area 702 containing the space cube 701. The screen coordinates of the four vertices of the square are 702 are (x0, y0), (x1, y0), (x0, y1), and (x1, y1), respectively.

In some embodiments, an area surrounded by the outline of the 3D virtual image in the display area may be determined as the image mapping area of the 3D virtual image. In practical applications, there may be many possible manners for determining the image mapping area of the 3D virtual image in the display area, which are not limited by the present disclosure.

At S602, using the position of the virtual camera as an originating point, a plurality of rays that pass through a plurality of sampling points in the display area respectively from the originating point are determined.

The area identified by the plurality of sampling points in the display area can be regarded as a sampling area in the display area. Correspondingly, the plurality of sampling points may represent a part of the display area that catches the user's attention.

The number of the sampling points and the positions thereof in the display area may be set according the actual needs.

Figure 8:
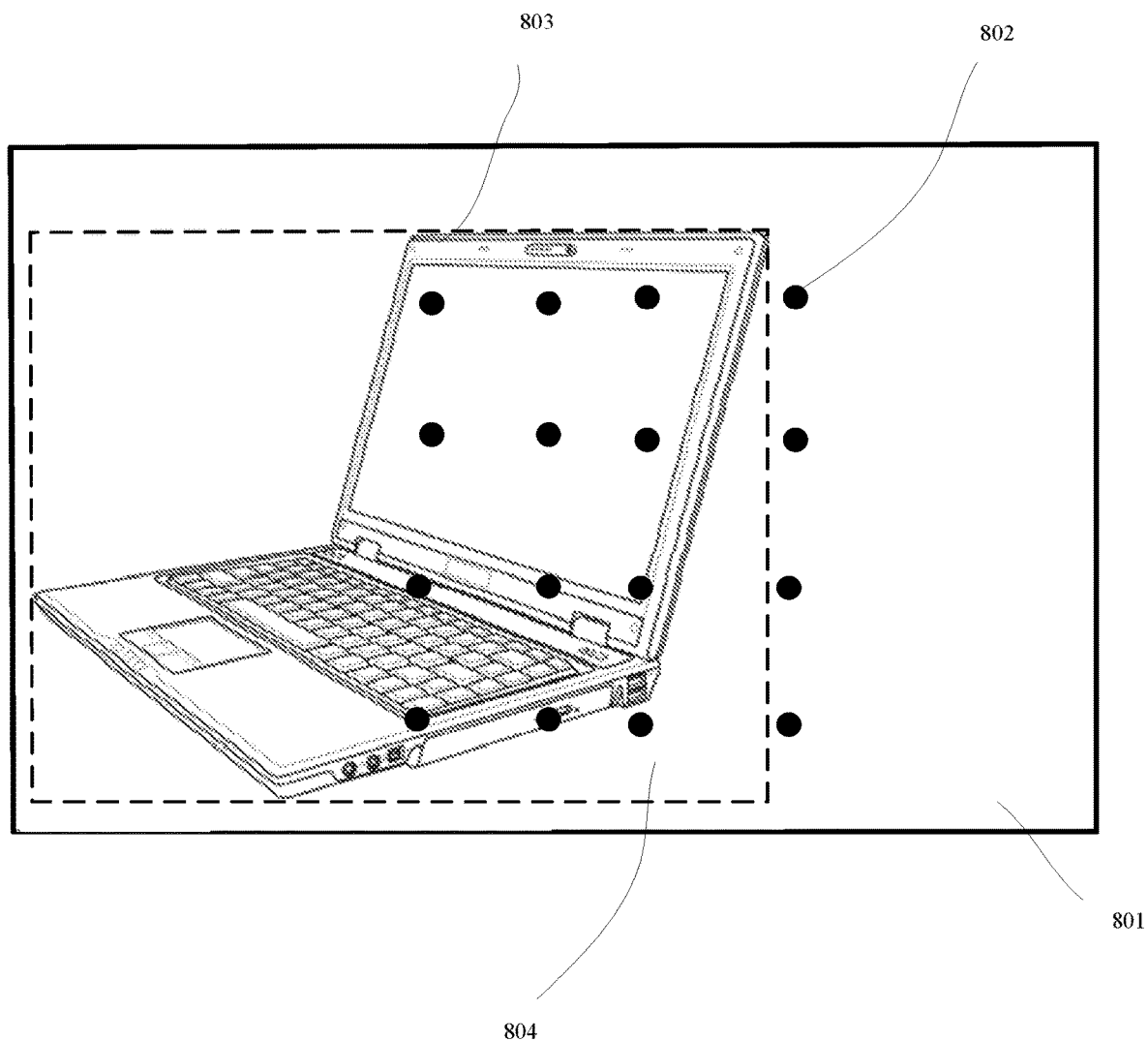
FIG. 8 is a schematic diagram of positions of sampling points in the display area according to some embodiments of the present disclosure.

FIG. 8 is a schematic diagram of positions of sampling points in the display area according to some embodiments of the present disclosure.

As shown in FIG. 8, positions of a plurality of sampling points 802 are configured in the display area 801. The plurality of sampling points 802 located in a part of the display area that is closer to the center area.

It should be noted that the sampling points are not points displayed in the display area. The positions of the sampling points are configured to determine the target object.

At S603, a sub-mapping area identified by the plurality of rays in the image mapping area is used to determine the target object that is identified by the plurality of rays in the 3D virtual image.

The image mapping area may include at least one sub-mapping area. Each sub-mapping area is a part of the image mapping area. In some embodiments. Each sub-mapping area corresponds to a mapping area of a constituent object of the 3D virtual image in the display area.

The sub-mapping area identified by the plurality of rays is a sub-mapping area that the plurality of rays pass through. Because the plurality of rays are rays originated from the position of the virtual camera to the plurality of sampling points, the sub-mapping area identified by the plurality of rays is actually located inside the sampling area, and can be focused on by the user.

Each ray corresponds to one sub-mapping area. Multiple rays may correspond to a same sub-mapping area.

In the embodiments of the present disclosure, the object of the 3D virtual image corresponding to the sub-mapping area identified by the plurality of rays may be determined as the target object.

The target object can be regarded as including: multiple object areas in the 3D virtual image. Each object area may be an image area of the 3D virtual image in one sub-mapping area. Or, each object area may be an image area of one constituent object of the 3D virtual image contained in one sub-mapping area.

For example, as shown in FIG. 8, the 3D virtual image is the 3D virtual image of a notebook computer. For the plurality of sampling points 802 shown in FIG. 8 and the image mapping area 804 of the 3D virtual image 803 of the notebook computer, it can be seen that some of the plurality of sampling points are located inside the image mapping area 804 of the notebook computer, and some of the plurality of sampling points are located outside the image mapping area 804 of the notebook computer.

Moreover, the area where the plurality of sampling points are distributed in the image mapping area 804 of the notebook computer includes: a screen image area and a keyboard image area in the 3D virtual image.

In this case, after the plurality of rays originated from the position of the virtual camera as the viewing angle position to the plurality of sampling points, the areas identified by the plurality of rays in the display area can be divided into two categories. One is located inside the image mapping area, and the other is located outside the image mapping area. The area located inside the image mapping area can be further divided into multiple sub-mapping areas according to the constituent objects of the notebook computer, and each sub-mapping area corresponds to a constituent object of the 3D virtual image of the notebook computer.

Figure 9:
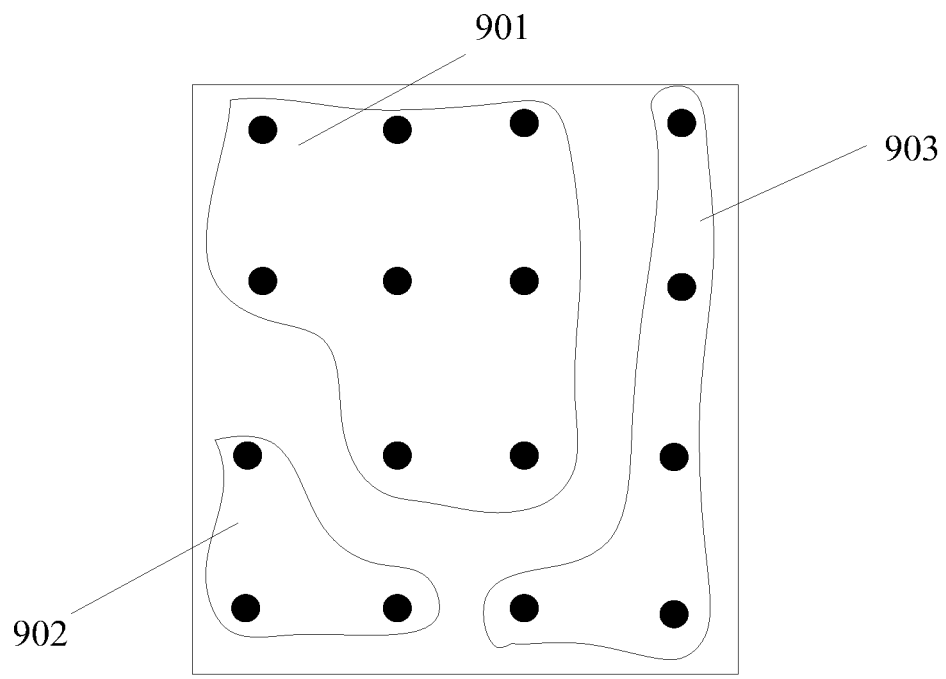
FIG. 9 is a schematic diagram of areas identified by a plurality of rays in the display area according to some embodiments of the present disclosure.

FIG. 9 is a schematic diagram of areas identified by a plurality of rays in the display area according to some embodiments of the present disclosure.

As shown in FIG. 8 and FIG. 9, the plurality of rays form three areas. Among the three areas, the areas located in the mapping area of the 3D virtual image of the notebook computer and corresponding to one of the constituent objects in the 3D virtual image include: an area 901 and an area 902. Thus, the area 901 and the area 902 both are sub-mapping areas. The area 903 does not include any constituent object in the 3D virtual image of the notebook computer.

Referring to FIG. 8 and FIG. 9, the area 901 is the screen image area in the 3D virtual image of the notebook computer, and the area 902 is the keyboard image area in the 3D virtual image of the notebook computer. As such, the part of the screen image area corresponding to the area 901 and the part of the keyboard image area corresponding to the area 902 can be determined as the target object, and the part of the screen image area corresponding to the area 901 and the part of the keyboard image area corresponding to the area 902 may be two object areas of the target object.

In some other embodiments, both the keyboard and the screen in the 3D virtual image can be determined as the target object.

Referring back to FIG. 5, at S504, based on the target object, an attention focus object in the 3D virtual image is determined.

For the description of S504, reference can be made to previous descriptions.

For example, when the target object includes at least one target object area, the attention focus object can be determined from the at least one target object area based on a display feature of the at least one target object area.

In some embodiments, the display feature of the target object area may include: a position of the target object in the display area or the sampling area, and an area occupation ratio of the target object area over the image mapping area or the sampling area of the 3D virtual image.

For example, the larger the area occupation ratio of the target object area over the sampling area or the larger the number of sampling points contained in the target object area, the greater the possibility that the user will pay attention to the target object area. The present disclosure may determine one or more target object areas that contain a large number of sampling points or have the highest area occupation ratio in the sampling area as the attention focus object, or determine the constituent object of the 3D virtual image corresponding to the target object area as the attention focus object.

In some embodiments, when the target object is an entire object and contains at least one constituent object (a component or a part, etc.), the present disclosure may further determine a distribution feature of each part of the target object within the sampling area. The distribution feature includes a relative positional relationship of each part of the target object within the sampling area and the area size of each part of the target object within the sampling area. The area size may be determined by the number of sampling points contained in each part of the target object (or the number of rays passing through each part of the target object).

Correspondingly, the attention focus object in the 3D virtual image may be determined based on the distribution feature of each part of the target object within the sampling area.

As shown in FIG. 8 and FIG. 9, the target object in the 3D virtual image of the notebook computer includes the screen image area and a part of the keyboard image area (or the target object includes the screen and the keyboard, the principle is the same). However, the part of the screen image area has a larger area in the sampling area and its relative position is closer to the center area. Thus, the screen image area or the screen can be determined as the attention focus object.

It should be understood that, in the embodiments of the present disclosure, after the attention focus object in the 3D virtual image is determined, the number of times of attention occurrence of the attention focus object may be counted, and the number of times of attention occurrence of the attention focus object may be stored. For example, if a certain object part in the 3D virtual image is determined as the attention focus object, a count of the attention occurrence of the corresponding object part will be increased by one.

Similarly, in the embodiments of the present disclosure, after the attention focus object in the 3D virtual image is determined, attention duration of the attention focus object may also be obtained.

It should be understood that after the 3D virtual image is displayed and an object in the 3D virtual object is determined as the attention focus object, if the displayed 3D virtual image is not adjusted, the object in the 3D virtual image will remain as the attention focus object. In some embodiments, the attention duration of the object being determined as the attention focus object may be counted until the object is no longer the attention focus object. Thus, the attention duration of the object being determined as the attention focus object can be obtained for the current attention occurrence. Further, in some embodiments, the attention duration of the attention focus object for each attention occurrence may be accumulated, and the cumulative attention duration for each attention focus object may be obtained persistently.

It should be understood that in the embodiments of the present disclosure, by determining the attention focus object in the 3D virtual image of the physical object, the user's attention focus on the physical object can be obtained. In addition, different users' attention focus part on the physical object may be counted to analyze and determine the part of the physical object that the user pays more attention to. Thus, priority may be given to upgrading the part of the physical object that the user pays more attention or optimizing to resolve problems existed in the corresponding part.

In addition, determining the attention focus object in the 3D virtual image of the physical object, the cumulative attention duration and the number of times of occurrence of the attention focus object are conducive to the analysis and comparison of user attention from multiple different dimensions, and may also be used in big data analysis for other scenarios, thereby providing reliable data support for determining user attention information and the related big data analysis.

In addition to the method for acquiring an object's attention information, the present disclosure provides an apparatus for acquiring an object's attention information.

Figure 10:
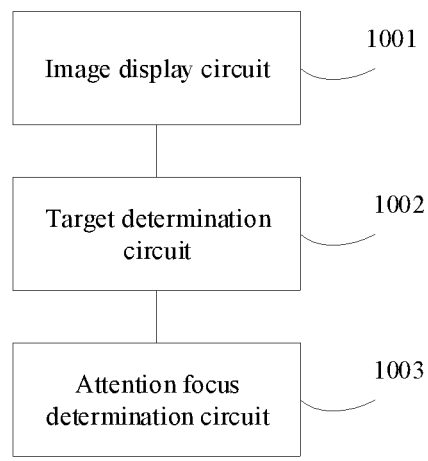
FIG. 10 is a schematic structural diagram of an exemplary apparatus for acquiring an object's attention information according to some embodiments of the present disclosure.

FIG. 10 is a schematic structural diagram of an exemplary apparatus for acquiring an object's attention information according to some embodiments of the present disclosure. The apparatus may be applied to the electronic device. As shown in FIG. 10, the apparatus includes: an image display circuit 1001, a target determination circuit 1002, and a attention focus determination circuit 1003. The image display circuit 1001 is configured to display a 3D virtual image in a virtual scene. The 3D virtual image is a 3D image corresponding to a virtual object in the virtual scene mapped from a physical object. The target determination circuit 1002 is configured to determine a target object of the 3D virtual image displayed in a display area. The attention focus circuit 1003 is configured to determine an attention focus object of the 3D virtual image based on the target object. The attention focus object belongs to at least a part of the 3D virtual image.

In some embodiments, the target determination circuit includes a target determination sub-circuit configured to determine the target object in a sampling area of the 3D virtual image displayed in the display area.

In some embodiments, the target determination sub-circuit includes a camera determination sub-circuit configured to determine a current position of a virtual camera in the virtual scene, and an object determination sub-circuit configured to determine the target object in the sampling area of the 3D virtual image displayed in the display area using the position of the virtual camera as a viewpoint position.

In some embodiments, the object determination sub-circuit includes: a mapping area determination sub-circuit configured to determine an image mapping area where the 3D virtual image is mapped to the display area; a ray construction sub-circuit configured to use the position of the virtual camera as an originating point to determine a plurality of rays that pass through a plurality of sampling points in the display area from the originating point; and a formation sub-circuit configured to form a sub-mapping area in the image mapping area by the plurality of rays to determine the target object identified by the plurality of rays in the 3D virtual image.

In some embodiments, determining the target object by the target determination circuit or the target determination sub-circuit includes: determining at least one target object area in the 3D virtual image and a display feature of the at least one target object area. The attention focus determination circuit includes: a first attention focus determination circuit configured to determine the attention focus object of the at least one target object area based on the display feature of the at least one target object area.

In some embodiments, the apparatus further includes: a feature determination circuit configured to determine a distribution feature of each part of the target object in the sampling area before the attention focus determination circuit determines the attention focus object of the 3D virtual image. The attention focus determination circuit further includes: a second attention focus determination circuit configured to determine the attention focus object of the 3D virtual image based on the distribution feature of each part of the target object in the sampling area.

In some embodiments, the apparatus further includes: a count accumulation circuit configured to accumulate a number of times of attention occurrence of the attention focus object; and account storage circuit configured to store the number of times of attention occurrence of the attention focus object.

In some embodiments, the apparatus further includes: an attention duration acquisition circuit configured to obtain an attention duration of a current attention occurrence of the attention focus object after the attention focus determination circuit determines the attention focus object of the 3D virtual image; and an attention duration accumulation circuit configured to accumulate the attention duration of each attention occurrence of the attention focus object.

Figure 11:
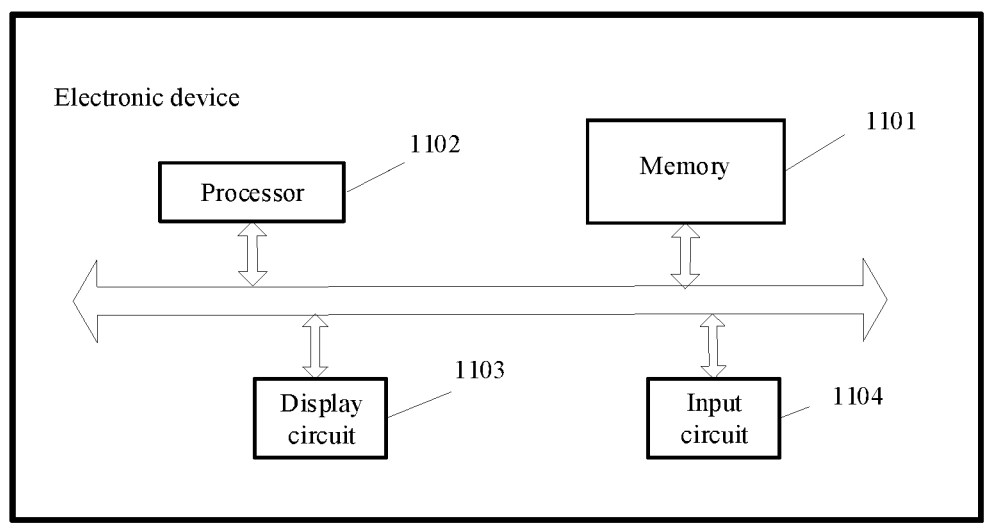
FIG. 11 is a schematic structural diagram of an exemplary electronic device according to some embodiments of the present disclosure.

The present disclosure also provides an electronic device. FIG. 11 is a schematic structural diagram of an exemplary electronic device according to some embodiments of the present disclosure. The electronic device may be any type of electronic devices. As shown in FIG. 11, the electronic device to least includes a memory 1101 and a processor 1102. The processor 1102 is configured to perform the disclosed method for acquiring an object's attention information. The memory 1101 is configured to store programs to be executed by the processor 1102.

In some embodiments, the electronic device may further include a display circuit 1103 and an input circuit 1104.

The electronic device may include more or less components than those shown in FIG. 11, which are not limited by the present disclosure.

The present disclosure also provides a non-volatile computer-readable storage medium. The non-volatile computer-readable storage medium stores at least one instruction, at least one program, a code set or a instruction set. The at least one instruction, the at least one program, the code set or the instruction set may be loaded and executed by the processor to perform the disclosed method for acquiring an object's attention information.

The present disclosure also provides a computer program. The computer program includes computer instructions, and the computer instructions are stored in a computer-readable storage medium. When the computer program runs on the electronic device, it is used to execute the disclosed method for acquiring an object's attention information.

Various embodiments in the specification are described in a progressive manner, and each embodiment focuses on the differences from other embodiments, and for the same and similar parts between the various embodiments, reference can be made to each other. At the same time, the features described in the embodiments in the specification may be replaced or combined with each other, such that those skilled in the art can realize or use the present disclosure. As for the devices disclosed in the embodiments, because of the correspondence to the method disclosed in the embodiments, the description is relatively simple, and reference can be made to the description of the method for relevant parts.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

The above description of the disclosed embodiments is provided to enable any person skilled in the art to make or use the present application. Various modifications to these embodiments will be readily apparent to those skilled in the art, and the general principles defined herein may be implemented in other embodiments without departing from the spirit or scope of the application. Therefore, the present application will not be limited to the embodiments shown herein, but is to be accorded the widest scope consistent with the principles and novel features disclosed herein.

The above description of the disclosed embodiments enables those skilled in the art to implement or use this application. Various modifications to these embodiments will be obvious to those skilled in the art, and the general principles defined herein can be implemented in other embodiments without departing from the spirit or scope of the present application. Therefore, this application will not be limited to the embodiments shown in the specification, but should conform to the broadest scope consistent with the principles and novelties disclosed in the specification.

What is claimed is:

1. A method for acquiring an object's attention information, comprising:
    displaying, at a two-dimensional (2D) display area, a three-dimensional (3D) virtual image in a virtual scene, the 3D virtual image being a 3D image corresponding to a virtual object in the virtual scene mapped from a physical object, the displaying comprising mapping the 3D virtual image to the 2D display area from a viewpoint position in the virtual scene, one or more constituent components of the virtual object corresponding, one-to-one, to one or more constituent components of the physical object;
    determining a target object of the 3D virtual image displayed in the 2D display area, the target object being at least a portion of the 3D virtual image displayed in the 2D display area representing a subset of the one or more constituent components of the virtual object; and
    based on the target object, determining, without using an eye tracking device, an attention focus object of the 3D virtual image, the attention focus object belonging to at least a part of the 3D virtual image, the attention focus object representing at least one first constituent component of the subset of the one or more constituent components of the virtual object, the attention focus object being indicative of an attention focus of a user on a constituent component of the physical object corresponding to the at least one first constituent component of the virtual object.

2. The method according to claim 1, wherein determining the target object of the 3D virtual image displayed in the 2D display area comprises:
    determining the target object in a sampling area of the 3D virtual image displayed in the 2D display area.

3. The method according to claim 2, wherein determining the target object in the sampling area of the 3D virtual image displayed in the 2D display area comprises:
    determining a current position of a virtual camera in the virtual scene; and
    using the current position of the virtual camera as the viewpoint position to determine the target object in the sampling area of the 3D virtual image displayed in the 2D display area.

4. The method according to claim 3, wherein using the current position of the virtual camera as the viewpoint position to determine the target object in the sampling area of the 3D virtual image displayed in the 2D display area comprises:
    determining an image mapping area where the 3D virtual image is mapped into the 2D display area;
    using the current position of the virtual camera as an originating point, determining a plurality of rays from the originating point to pass through a plurality of sampling points in the 2D display area; and
    based on a sub-mapping area identified by the plurality of rays in the image mapping area, determining the target object identified by the plurality of rays in the 3D virtual image.

5. The method according to claim 1, wherein:
    the target object includes at least one target object area in the 3D virtual image and a display feature of the at least one target object area; and
    determining the attention focus object of the 3D virtual image based on the target object includes: determining the attention focus object in the at least one target object area based on the display feature of the at least one target object area.

6. The method according to claim 2, wherein:
    before determining the attention focus object of the 3D virtual image, the method further includes: determining a distribution feature of each part of the target object in the sampling area; and
    determining the attention focus object of the 3D virtual image based on the target object includes: determining the attention focus object of the 3D virtual image based on the distribution.

7. The method according to claim 1, wherein after determining the attention focus object of the 3D virtual image, the method further comprises:
    counting a number of times of attention occurrence of the attention focus object; and
    storing the number of times of attention occurrence of the attention focus object.

8. The method according to claim 1, wherein after determining the attention focus object of the 3D virtual image, the method further comprises:
    obtaining an attention duration of attention occurrence of the attention focus object; and
    accumulating the attention duration of each attention occurrence of the attention focus object.

9. An apparatus for acquiring an object's attention information, comprising:
    a memory storing a computer program; and
    a processor coupled to the memory and configured to execute the computer program to:
        display, at a two-dimensional (2D) display are, a three-dimensional (3D) virtual image in a virtual scene, the 3D virtual image being a 3D image corresponding to a virtual object in the virtual scene mapped from a physical object, the displaying comprising mapping the 3D virtual image to the 2D display area from a viewpoint position in the virtual scene, one or more constituent components of the virtual object corresponding, one-to-one, to one or more constituent components of the physical object;

determine a target object of the 3D virtual image displayed in the 2D display area, the target object being at least a portion of the 3D virtual image displayed in the 2D display area representing a subset of the one or more constituent components of the virtual object; and based on the target object, determine, without using an eye tracking device, an attention focus object of the 3D virtual image, the attention focus object belonging to at least a part of the 3D virtual image, the attention focus object representing at least one first constituent component of the subset of the one or more constituent components of the virtual object, the attention focus object being indicative of an attention focus of a user on a constituent component of the physical object corresponding to the at least one first constituent component of the virtual object.

10. The apparatus according to claim 9, wherein when determining the target object of the 3D virtual image displayed in the 2D display area, the processor is further configured to:

determine the target object in a sampling area of the 3D virtual image displayed in the 2D display area.

11. The apparatus according to claim 10, wherein when determining the target object in the sampling area of the 3D virtual image displayed in the 2D display area, the processor is further configured to:

determine a current position of a virtual camera in the virtual scene; and use the current position of the virtual camera as the viewpoint position to determine the target object in the sampling area of the 3D virtual image displayed in the 2D display area.

12. The apparatus according to claim 11, wherein when using the current position of the virtual camera to determine the target object in the sampling area of the 3D virtual image displayed in the 2D display area, the processor is further configured to:

determine an image mapping area where the 3D virtual image is mapped into the 2D display area;

use the current position of the virtual camera as an originating point, determining a plurality of rays from the originating point to pass through a plurality of sampling points in the 2D display area; and based on a sub-mapping area identified by the plurality of rays in the image mapping area, determine the target object identified by the plurality of rays in the 3D virtual image.

13. The apparatus according to claim 9, wherein:

the target object includes at least one target object area in the 3D virtual image and a display feature of the at least one target object area; and determining the attention focus object of the 3D virtual image based on the target object includes: determining the attention focus object in the at least one target object area based on the display feature of the at least one target object area.

14. The apparatus according to claim 10, wherein:

before determining the attention focus object of the 3D virtual image, the method further includes: determining a distribution feature of each part of the target object in the sampling area; and determining the attention focus object of the 3D virtual image based on the target object includes: determining the attention focus object of the 3D virtual image based on the distribution.

15. The apparatus according to claim 9, wherein after determining the attention focus object of the 3D virtual image, the processor is further configured to:

count a number of times of attention occurrence of the attention focus object; and store the number of times of attention occurrence of the attention focus object.

16. The apparatus according to claim 9, wherein after determining the attention focus object of the 3D virtual image, the processor is further configured to:

obtain an attention duration of attention occurrence of the attention focus object; and accumulate the attention duration of each attention occurrence of the attention focus object.

17. An electronic device, comprising an apparatus for acquiring an object's attention information, wherein the apparatus comprises:

a memory storing a computer program; and a processor coupled to the memory and configured to execute the computer program to:

display, at a two-dimensional (2D) display area, a three-dimensional (3D) virtual image in a virtual scene, the 3D virtual image being a 3D image corresponding to a virtual object in the virtual scene mapped from a physical object, the displaying comprising mapping the 3D virtual image to the 2D display area from a viewpoint position in the virtual scene, one or more constituent components of the virtual object corresponding, one-to-one, to one or more constituent components of the physical object;

determine a target object of the 3D virtual image displayed in the 2D display area, the target object being at least a portion of the 3D virtual image displayed in the 2D display area representing a subset of the one or more constituent components of the virtual object; and based on the target object, determine, without using an eye tracking device, an attention focus object of the 3D virtual image, the attention focus object belonging to at least a part of the 3D virtual image, the attention focus object representing at least one first constituent component of the subset of the one or more constituent components of the virtual object, the attention focus object being indicative of an attention focus of a user on a constituent component of the physical object corresponding to the at least one first constituent component of the virtual object.

18. The electronic device according to claim 17, wherein when determining the target object of the 3D virtual image displayed in the 2D display area, the processor is further configured to:

determine the target object in a sampling area of the 3D virtual image displayed in the 2D display area.

19. The electronic device according to claim 18, wherein when determining the target object in the sampling area of the 3D virtual image displayed in the 2D display area, the processor is further configured to:

determine a current position of a virtual camera in the virtual scene; and use the current position of the virtual camera to determine the target object in the sampling area of the 3D virtual image displayed in the 2D display area.

20. The electronic device according to claim 19, wherein when using the current position of the virtual camera to determine the target object in the sampling area of the 3D virtual image displayed in the 2D display area, the processor is further configured to:

determine an image mapping area where the 3D virtual image is mapped into the 2D display area;
use the current position of the virtual camera as an originating point, determining a plurality of rays from the originating point to pass through a plurality of sampling points in the 2D display area; and
based on a sub-mapping area identified by the plurality of rays in the image mapping area, determine the target object identified by the plurality of rays in the 3D virtual image.

* * * * *